Patented June 3, 1947

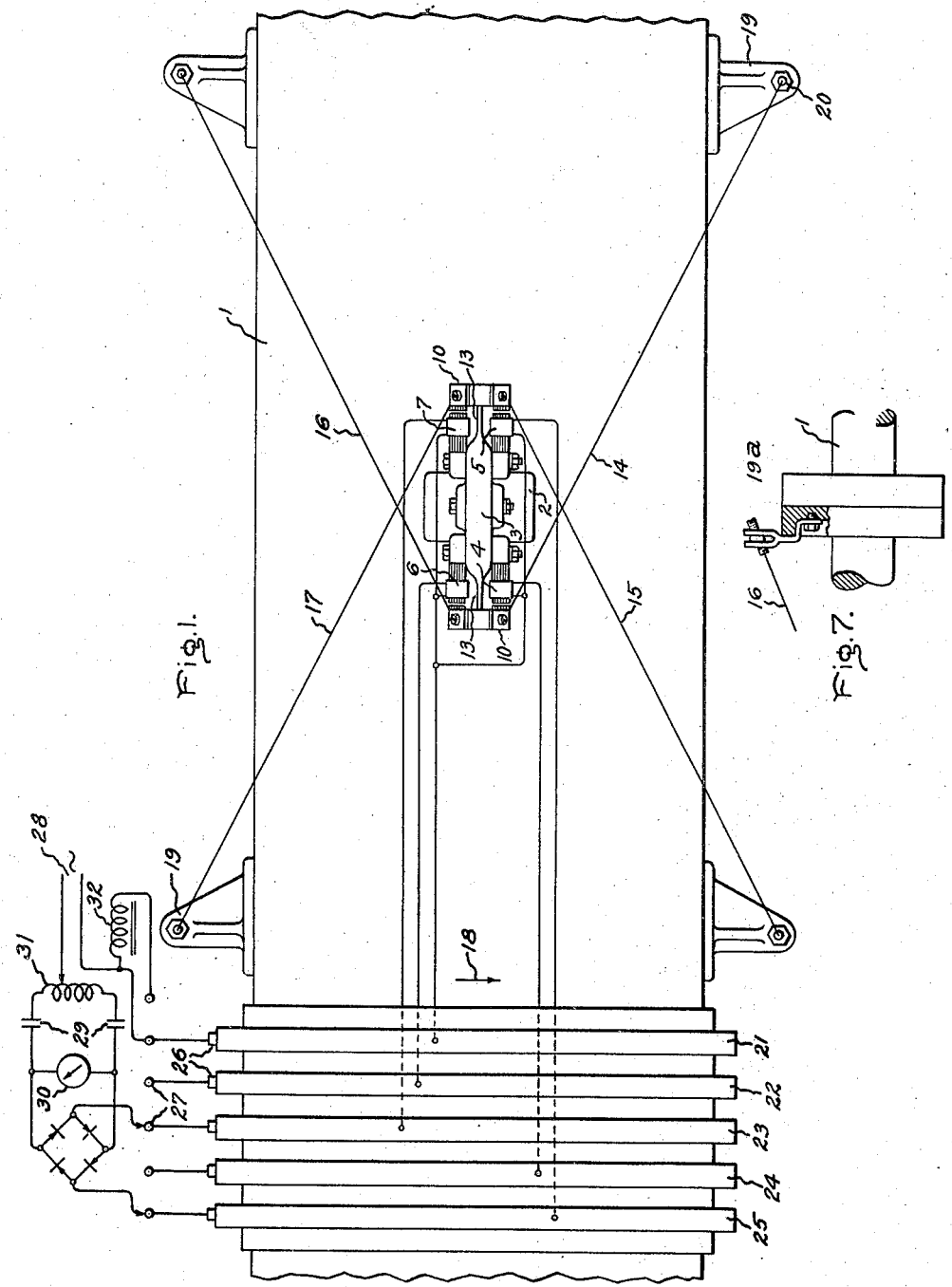

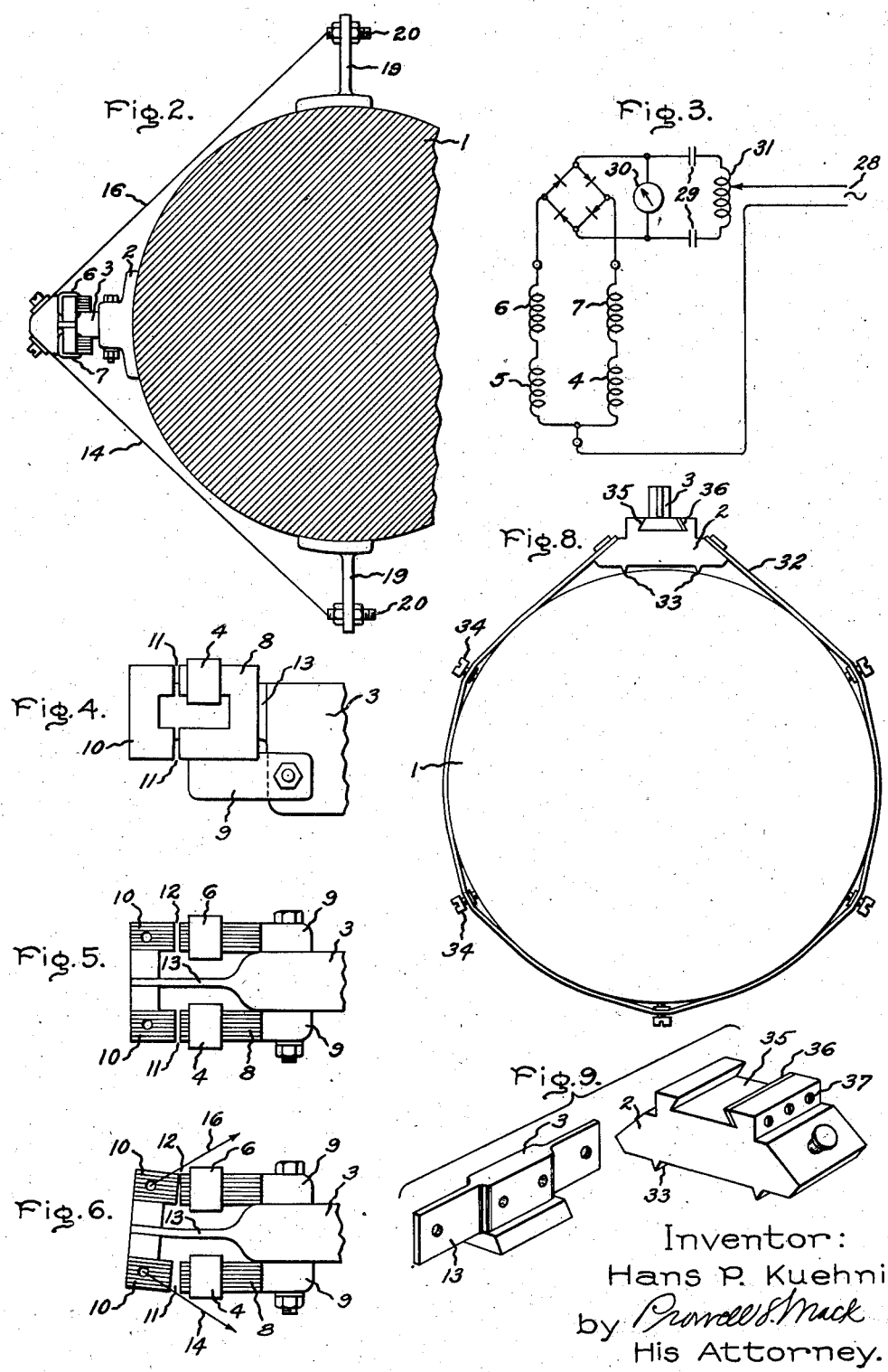

2,421,626

UNITED STATES PATENT OFFICE 2,421,626

TORQUE MEASUREMENT

Hans P. Kuehni, Schenectady, N. Y., assignor to General Electric Company, a corporation of New York Application July 2, 1945, Serial No. 602,734

6 Claims. (Cl. 73—136)

My invention relates to apparatus for measuring the torque of large rotating shafts, and its object is to provide reliable apparatus of the class described which very materially reduces the size, weight, cost, and maintenance of such apparatus and which may be temporarily attached to shafts such as, for example, propeller shafts of marine vessels.

In carrying my invention into effect, I make use of one or more electric measuring elements such as differential variable reactances secured to the shaft and connect the movable element thereof to axially spaced parts of the shaft through small diameter flexible wires stretched taut, such that a twist in the shaft will act differentially on the movable element of the measuring device to provide an amplified measurement of such twist. In this way the bulk, weight, size, and cost of the measuring equipment directly associated with the shaft are reduced to a minimum, and due to the differential arrangement variations in temperature, voltage, resiliency of the wires, centrifugal force, etc. cancel out and do not influence the measurement. Torque may be measured of shafts either in rotation or while stationary, and hence, the invention may be used for measuring strain or relative displacement of stationary parts.

The features of my invention which are believed to be novel and patentable will be pointed out in the claims appended hereto. For a better understanding of my invention, reference is made in the following description to the accompanying drawings in which Fig. 1 represents somewhat diagrammatically a plan view of a preferred embodiment of my invention as applied for measuring the torque of a shaft; Fig. 2 is a shaft end view of the shaft apparatus of Fig. 1; Fig. 3 represents a series parallel measurement connection that may be employed with four measuring elements; Fig. 4 represents a side view of one pair of the variable reactance elements; Fig. 5 a top view of such pair in a central or zero measurement condition; and Fig. 6 a similar view but with the armatures moved from a zero measurement position; Figs. 7 and 8 represent different ways of securing parts of my measuring apparatus to a rotating shaft, and Fig. 9 an adjustable dovetail arrangement that may be employed in the reactance measuring head.

Referring now to Figs. 1 and 2, 1 represents a section of a shaft the torque of which it is desired to measure. Secured to the shaft is a support plate 2 having a T-shaped radial extension 3 which is preferably arranged to be adjustable with respect to the base plate 2. The T-shaped part 3 carries, in this case, four variable reactance devices 4, 5, 6 and 7 arranged in pairs at each end, these devices each consisting of a magnetic circuit including at least one air gap, a winding on the magnetic circuit all arranged to vary the reactive impedance by varying of the air gap as best shown in Figs. 4, 5 and 6. As illustrated in Figs. 4 and 5, reactance devices 4 and 6 comprise a pair at one end of the T-shaped member 3, the reference numerals 4 and 6 indicating the coils of such variable reactance devices. Such devices may comprise a U-shaped laminated magnetic core 8 secured in fixed relation to the supporting head 3 as by parts 9 and movable magnetic armature parts 10 spaced from the parts 8 by small air gaps at 11 and 12, 11 designating the gaps for reactance device 4, and 12 the gaps for reactance device 6. The armature parts for the pair of reactance devices are secured together in spaced relation at the end of a relatively short and stiff resilient tongue member 13 extruding from the end of head 3. The other reactance elements 5 and 7 comprise another similar pair similarly mounted at the other end of head 3.

When the armatures are in a central or zero measurement position as represented in Fig. 5, all of the reactance devices have equal reactance, and this occurs when the resilient tongue members are straight as indicated in Fig. 5. It will now be seen that if the tongue 13 be bent as represented, to an exaggerated extent, in Fig. 6, such as might be caused by an unequal tension on wires 14 and 16 secured to the movable armature assembly, the air gaps 11 of reactance 4 will increase while the air gaps 12 of reactance device 6 will decrease, thus changing the pair of reactances differentially. Thus, for the condition represented, the reactance of 4 will decrease and the reactance of 6 will increase. In order thus to vary the reactance in response to the twist of the shaft, the wires 14 and 16 have their opposite ends secured to the shaft at points which are axially and circumferentially displaced from the head 3 as represented in Figs. 1 and 2, so that if a twist occurs in the shaft, one wire of a pair will be tensioned and the other wire detensioned by an amount proportional to such twist. The control wires for the other pair of reactance devices 5 and 7 are indicated at 15 and 17 in Fig. 1. It is seen that the wires 14 and 16 extend axially along the shaft by an equal amount in the same direction from head 3, but circumferentially these wires extend about the shaft an equal distance in opposite directions. Hence, if there is a twist in the shaft between the axial points of support of the wires, such, for example, as represented by the relative direction of the arrows 18, Fig. 1, wires 16 and 15 will be tensioned and wires 14 and 17 will be detensioned. Such direction of shaft twist will cause the direction of armature movement represented in Fig. 6 for that particular pair.

The anchor supports for the wires of a pair determine the base of a triangle with the gauge head at its apex and these anchor points preferably rise above the surface of the shaft a sufficient distance that the wires clear the shaft as indicated in Fig. 2, although this is not of great importance, since the tension in the wires is large as compared to the small friction which would be encountered by contact with the shaft. Such anchor supports may be of the character represented at 19 in Figs. 1 and 2, the supports being secured to the shaft in any suitable manner. In Figs. 1 and 2 it will be assumed that the anchors 19 and the base support 2 for the variable reactance assembly are secured to the shaft 1 by a small amount of spot welding. For initially adjusting the tension of the wires, the ends which are secured to anchors 19 are preferably secured to a bolt 20 which may be adjusted through the support 19 to adjust the wire tension and then secured in place for such adjustment. For the wires themselves I may use piano wire or small wires of any material having good strength and a small amount of stretch. A material such as phosphor bronze which does not corrode easily may be used. In the claims I have designated the character of such wires by the expression "in the nature of piano wires."

While different ways of initial calibration may be used, it will be assumed that with no torque or twist on the shaft, all four wires will be adjusted to have the same tension with the resilient tongue members 13 in their central positions, and with the air gaps of the several reactance devices equal. It should be mentioned here that the wires 14 and 16 should have equal tension, also wires 15 and 17, but that it is not important to have wires 14 and 15 or 16 and 17 of equal tension if the head is of good rigidity and well anchored to the shaft.

In order to obtain measurements of the variation in reactance, the reactance coils are connected through slip rings and brushes to suitable stationary measuring apparatus. In Fig. 1 one side of each coil is connected in common to a slip ring 21 and the other sides of coils 6, 7, 4 and 5 are connected respectively to slip rings 22, 23, 24 and 25. Brushes 26 bear on the several slip rings and are connected to a corresponding number of measurement terminals 27.

Owing to the manner in which the measurement elements are used differentially in pairs, a bridge measurement circuit is appropriate, and several forms of bridge measurement circuits may be used. The one illustrated in Fig. 1 is of the rectifier type essentially like that of Fig. 4 of United States Patent No. 1,964,141, June 26, 1934, to Rhodes et al., shown connected through slip rings 21, 23 and 25 to reactance coils 5 and 7 and a source of alternating current supply 28. A frequency supply of 2000 cycles will give good results. Coils 5 and 7 constitute two arms of the bridge and condensers 29 constitute the other two arms of the bridge. A sensitive direct current measuring instrument 30 is connected across the bridge, and a variable impedance 31 may be provided at one terminal of the bridge for final bridge balancing purposes. For simultaneous check readings two such rectifier instruments may be used.

If the bridge is balanced with no torque on shaft 1 and with equal tension on wires 14 and 16, any twist in the shaft will be indicated by a reading on instrument 30, and the deflection from zero will be proportional to such twist or torque and the apparatus calibrated accordingly. Then the instrument may be switched to slip rings 22 and 24 to obtain a check reading using reactance coils 4 and 6. Likewise, coils 4 and 5 or coils 6 and 7 may be used in pairs for check reading. Hence, four check measurements or readings are possible, and any measurement that appears to be badly off may be eliminated and the remainder averaged.

The apparatus may also be calibrated for doubling the range over which the shaft 1 twists for a given installation as follows: With no twist of the shaft deflect the movable armature elements 10 from the central or equal air gap positions by a readjustment of the tension in the wires 14, 15, 16 and 17 in the direction opposite to that in which they will deflect when torque is put on the shaft and balance the bridge circuit for this condition. Then when the shaft is twisted, the instrument will read in proportion to the twist and resulting unbalance, and the apparatus may be calibrated for use in this way. Likewise, a zero center direct current instrument may be used and the bridge balanced for an intermediate value of torque. It is evident that torque measurements may be made by apparatus provided with only one pair of the variable impedance elements or, in fact, with only one variable impedance on the shaft. In Fig. 1, I have shown a standard impedance 32 with which the several variable impedances 4, 5, 6 and 7 may be individually compared and by means of which four additional torque measurements may be made using the variable impedances individually with the standard impedance 32. The sensitivity of the measurement may be increased and averaged for a given amount of shaft twist by connecting impedances 4 and 7 in series in one arm of the bridge and connecting impedances 5 and 6 in series in the other arm of the bridge as represented in Fig. 3. Here only three slip rings are needed if the series connections are made between the coils at the gauge head. The apparatus is sufficiently sensitive that only a comparatively short length of shaft need be used to accommodate the installation. For example, let it be assumed that shaft 1 is a 16-inch diameter shaft of suitable material for shaft purposes. Such a shaft when fully loaded to safe limits will twist by about 0.0108 inch measured at its periphery over 20 inches of shaft length. Assuming that the distance between the center of the gauge head at 2 and the anchors at 19 is 15 inches measured along the shaft, this will allow for an air gap variation at the gauges of about 0.005 inch between zero and full load torque, which experience has shown to give a satisfactory reactance variation and measurement range with the type of circuit proposed. The over-all shaft length used including that required for the five slip rings for a 16-inch diameter shaft need not exceed 40 inches for the apparatus as arranged in Fig. 1.

It is to be noted that the apparatus will measure torque whether the shaft be rotating or stationary, and hence, could be used for measuring relative displacement of ports for various purposes. For instance, with the shaft stationary one could measure the direction and extent of bending. Since the measurement elements are used differentially in similar pairs, temperature variations, vibration, centrifugal force, voltage variations, end play of the shaft, speed of rotation, and the like, if they have any influence, will influence each pair of similar measurement elements alike and not influence the accuracy of the measurement. Bending of the shaft will not influence the measurement where units 6 and 7 or 4 and 5 are used in pairs. The apparatus is relatively light in weight, of small bulk, and easily shipped, assembled and disassembled, and compares very favorably with prior shaft torque measuring apparatus of like accuracy in these respects.

The parts may be secured in place on the shaft in various ways. In some instances it will be possible to anchor the wire ends to parts already on the shaft, such as couplings, etc., as indicated at 19a in Fig. 7. The parts may also be strapped on the shaft with steel bands 32 as represented in Fig. 8.

In Fig. 8 the gauge head base 2 is provided with knife edges 33 which seat themselves on the shaft 1 and when the steel band 32 is tightened, by means of tightening bolts 34 arranged to expand the band 32 with respect to the shaft, the knife edges slightly cut into the shaft. This seating operation may be aided by lightly tapping the head 2 with a hammer, the blows being directed toward the shaft, while the strap 32 is being tightened. This and other ways of firmly securing the gauge head and wire anchors to the shaft to prevent slippage in use and without injuring the shaft may be employed. As shown in Figs. 8 and 9 the base 2 is connected to the head part 3 by a dovetailed joint at 35. By using wedges 36 in the dovetailed joint and tightening screws 37, a rigid yet adjustable fastening together of these parts is provided.

One of the common troubles encountered with torque measuring devices is the slipping of some part during operation due to vibration, twist of the shaft, etc. My torque measuring apparatus is designed to avoid such difficulties but should they occur during test, slippage may readily be detected because of the several variable impedance measuring circuits employed and by means of which they may be checked against each other at any stage of the testing procedure. Also, after the test has been finished, each measuring circuit combination may be checked to see if it has its initial calibration, and in any circuit combination which shows a serious departure from initial calibration the test reading obtained from that circuit may be disregarded.

What I claim as new and desire to secure by Letters Patent of the United States is:

1. Apparatus for measuring relative displacement at the surface of a body along a given axis comprising a pair of variable reactance devices adapted to be secured to the surface of such body at a given point, anchors also adapted to be secured to the surface of said body at other points on its surface such that said other points are at the extremities of the base of a triangle which is parallel to said given axis and with the variable reactance devices located at the apex of the triangle, said reactance devices each having a magnetic circuit containing an air gap, resilient means common to both reactance devices for determining said air gaps and movable under force along said given axis so that as one air gap is increased the other air gap is decreased and vice versa, and wires in the nature of piano wires stretched between said two anchors and the resilient air gap determining means of said reactances tending to bias said resilient means in opposite directions along said given axis, and a measuring circuit responsive to the differential variation of said reactances.

2. Equipment for use in measuring the twist of a longitudinal body such as a shaft comprising a pair of measuring devices adapted to be anchored to such body at a given point on its surface, said measuring devices each having a movable member and means responsive to the movement of said member for producing an electrical response, the movable members of said measuring devices being mounted on a common resilient support movable under pressure so as to move said members to vary the electrical responses of said measuring devices differentially, a pair of anchor means adapted to be secured to the surface of such body at points displaced in the same direction along the axis of said body and displaced in opposite peripheral directions of said body from said pair of measuring devices, and wires in the nature of piano wires stretched between said anchor means and the resilient support of said measuring devices whereby when said body is twisted there is a differential electrical response of said measuring devices proportional to such twist.

3. Equipment responsive to the twist of a longitudinal body such as a shaft comprising a pair of electrical displacement response devices adapted to be fixed to such body at a given point on its surface, said devices each having a movable member for varying the electrical response thereof, said members being fixed to a common flexible support, subject to displacement in response to a force, for moving said movable members to produce a differential response in the pair of electrical devices, a pair of anchor means adapted to be fixed to the surface of said body at points equally distant and in the same longitudinal direction from and equally distant from and in opposite peripheral directions from said pair of displacement response devices, wires in the nature of piano wires stretched between said anchors and said flexible support such that if there is twist in such body there will be a differential electrical response in the pair of electrical devices proportional to such twist, and an electrical measuring circuit for measuring the magnitude of such differential electrical response.

4. Apparatus for measuring twist in shafts and the like comprising a gauge head adapted to be fixed to the periphery of such shaft, four electrical gauging devices on said head each having a movable element for varying its electrical response, said movable elements being grouped in pairs and each pair being mounted on a resilient member which is movable, laterally of the shaft, in response to pressure to differentially vary the electrical response of the pair of gauging devices with which associated, four anchor elements adapted to be fixed to the periphery of said shaft at four points spaced peripherally and axially away from said gauge head such that the gauge head lies symmetrically within the center of the anchor grouping, wires in the nature of piano wire stretched between said anchor elements and the resilient movable elements on said gauge head, the wires to one of said movable elements being connected to the anchors which are spaced from said gauge head in one axial direction of the shaft and the other of said movable elements being connected to the anchors which are spaced from the gauge head in the opposite axial direction of such shaft, whereby when there is a twist in the shaft between the anchor parts, each pair of electrical gauging devices responds differentially, an electrical measuring circuit and connections whereby different pairs of said gauging devices may be connected in said circuit for producing a measurement proportional to the twist in such shaft.

5. In apparatus for measuring the twist of shafts, a gauge head adapted to be temporarily but securely fixed to the surface of a circular shaft without injury to the shaft, said gauge head having a base with parallel knife edge ridges adapted to be set on the shaft with the ridges against the shaft and parallel thereto, a metal strap with its ends secured to the sides of said base adapted to surround the shaft to strap the base thereto, a plurality of bolts threaded through the strap at different points about the shaft to contact the surface of the shaft and when tightened to force the strap away from the shaft at such points thereby to tighten the strap, and gauging means adjustably secured on said base by a dovetail connection.

6. In apparatus for measuring the twist of shafts, a gauge head and an anchor both adapted to be secured to the surface of a shaft at points spaced axially and peripherally of such shaft, and a fine metal wire less than $\frac{1}{16}$ inch in diameter stretched between said gauge head and anchor adapted to be tensioned to operate the gauge in response to twist in said shaft, said wire being secured to said anchor and gauge head parts a sufficient distance from the surface of the shaft that it does not contact the shaft between its ends, and means at one end of such wire at the point where it is fastened for adjusting its tension independently of twist in said shaft.

HANS P. KUEHNI.

REFERENCES CITED

The following references are of record in the file of this patent:

UNITED STATES PATENTS

| Number | Name | Date |
| --- | --- | --- |
| 2,332,288 | Zeithin | Oct. 19, 1943 |
| 996,314 | Clayton | June 27, 1911 |
| 1,227,043 | Cummings | May 22, 1917 |
| 2,359,125 | Langer et al. | Sept. 26, 1944 |
| 2,392,293 | Ruge | Jan. 1, 1946 |

Certificate of Correction

Patent No. 2,421,626.

June 3, 1947.

HANS P. KUEHNI

It is hereby certified that error appears in the printed specification of the above numbered patent requiring correction as follows: Column 4, line 75, for the word "ports" read *parts*; and that the said Letters Patent should be read with this correction therein that the same may conform to the record of the case in the Patent Office.

Signed and sealed this 19th day of August, A. D. 1947.

[SEAL]

LESLIE FRAZER,
*First Assistant Commissioner of Patents.*